United States Patent
Watanabe et al.

(10) Patent No.: US 6,903,264 B2
(45) Date of Patent: Jun. 7, 2005

(54) ELECTRIC WIRE COATED WITH POLYVINYL CHLORIDE RESIN COMPOSITION AND CABLE

(75) Inventors: Kiyoshi Watanabe, Hitachi (JP); Hiroyuki Ito, Hitachi (JP); Misako Saito, Nirasaki (JP); Teruyuki Hayashi, Nirasaki (JP); Naoya Hirayama, Tsukui-Gun (JP); Sadao Kobayashi, Tokyo (JP); Yoshihide Wakayama, Tokyo (JP)

(73) Assignees: Tokyo Electron Limited, Tokyo (JP); Taisei Corporation, Tokyo (JP); Hitachi Cable, Ltd., Ibaraki (JP)

( * ) Notice: Subject to any disclaimer, the term of this patent is extended or adjusted under 35 U.S.C. 154(b) by 0 days.

(21) Appl. No.: 10/478,641

(22) PCT Filed: May 23, 2002

(86) PCT No.: PCT/JP02/05020

§ 371 (c)(1),
(2), (4) Date: Nov. 25, 2003

(87) PCT Pub. No.: WO00/097830

PCT Pub. Date: Dec. 5, 2002

(65) Prior Publication Data

US 2004/0149482 A1 Aug. 5, 2004

(30) Foreign Application Priority Data

May 29, 2001 (JP) .................................. 2001-160047

(51) Int. Cl.⁷ ............................................. H01B 7/34
(52) U.S. Cl. .................. 174/36; 174/110 R; 174/120 R
(58) Field of Search ........................... 174/36, 110 R, 174/110 FC, 120 R, 120 C; 524/102, 290, 357, 320, 358, 399, 567, 423, 424

(56) References Cited

U.S. PATENT DOCUMENTS

| | | | |
|---|---|---|---|
| 4,427,816 A | * | 1/1984 | Aoki et al. ................. 524/357 |
| 5,814,691 A | * | 9/1998 | Kuhn et al. ................. 524/102 |
| 6,155,922 A | | 12/2000 | Kobayashi et al. |
| 6,162,540 A | * | 12/2000 | Tsuji et al. ................. 428/375 |
| 6,337,365 B1 | | 1/2002 | Matsuo et al. |

FOREIGN PATENT DOCUMENTS

| | | |
|---|---|---|
| EP | 1 039 481 A1 | 9/2000 |
| JP | 51-155378 | 12/1976 |
| JP | 09-324088 | 12/1997 |

* cited by examiner

Primary Examiner—William H. Mayo, III
(74) Attorney, Agent, or Firm—Finnegan, Henderson, Farabow, Garrett & Dunner LLP

(57) ABSTRACT

An electric wire with coating of polyvinyl chloride family resin composition is characterized by having a coating layer including polyvinyl chloride family composition obtained from adding more than one of any calcium soap, zinc soap and hydrotalcite to resin including polyvinyl chloride resin as a main constituent, and further adding thereto plasticizer so as to obtain a heat-stable vinyl chloride composition, and further adding thereto as stabilization auxiliaries high-melting-point β-diketone compound having a melting point more than 100° C. out of β-diketone compounds expressed by a general formula of R.CO.CH2.CO.R'.

21 Claims, 2 Drawing Sheets

FIG.3

| | EMBODIMENTS | | | | | | | COMPARATIVE EXAMPLE | | |
|---|---|---|---|---|---|---|---|---|---|---|
| | 1 | 2 | 3 | 4 | 5 | 6 | 7 | 1 | 2 | 3 |
| POLYVINYL CHLORIDE RESIN | 100 | 100 | | 100 | 100 | 100 | 100 | 100 | 100 | 100 |
| NBR | 100 | | | | | | | | | |
| EVA | | 100 | | | | | | | | 100 |
| CHLORINATED POLYETHYLENE-VINYL CHLORIDE GRAFT COPOLYMER | | | 100 | | | | | | | |
| DI-(2-ETHYL HEXYL)PHTHALATE (MOLECULAR WEIGHT OF 391) | | | | | | | | 80 | | |
| DITRIDECYL PHTHALATE (MOLECULAR WEIGHT OF 530) | | | | 80 | | | | | | |
| TRI-(2-ETHYL HEXYL)TRIMELLITATE (MOLECULAR WEIGHT OF 547) | | | | | 80 | 80 | 80 | | 80 | |
| CALCIUM STEARATE | 4 | 2 | 5 | 2 | | 2 | 2 | 2 | 2 | 2 |
| ZINK STEARATE | | 2 | 5 | 2 | 4 | 2 | 2 | 2 | 2 | 2 |
| HYDROTALCITE | 6 | 6 | | 6 | 6 | 6 | 6 | 6 | 6 | 6 |
| STEAROYL BENZOYLMETHANE (MELTING POINT OF 56°C) | | | | | | | | 1 | | |
| DIBENZOYLMETHANE (MELTING POINT OF 78°C) | | | | | | 1 | | | | |
| BIS(4-METHYL BENZOYL) METHANE (MELTING POINT OF 125°C) | | | | | | | | | 1 | |
| BIS(4-METHOXY BENZOYL) METHANE (MELTING POINT OF 140°C) | | | | | | | 1 | | | 1 |
| CALCINED CLAY | 10 | 10 | 10 | 10 | 10 | 10 | 10 | 10 | 10 | 10 |
| ANTIMONY TRIOXIDE | 6 | 6 | 6 | 6 | 6 | 6 | 6 | 6 | 6 | 6 |
| TETRAKIS-[METHYLENE-3-(3', 5'-DI-THIRD-BUTYL-4'-HYDROXYPHENYL)PROPIONATE]METHANE | 0.3 | 0.3 | 0.3 | 0.3 | 0.3 | 0.3 | 0.3 | 0.3 | 0.3 | 0.3 |
| GENERATED GASEOUS SUBSTANCE QUANTITY (μg/g) | 500 | 600 | 400 | 1700 | 1600 | 1900 | 1800 | 27000 | 6000 | 4300 |

ELECTRIC WIRE COATED WITH POLYVINYL CHLORIDE RESIN COMPOSITION AND CABLE

TECHNICAL FIELD

The present invention relates to an electric wire and cable with covering/coating of polyvinyl chloride family resin composition used in a clean room or so, and, in particular, to an electric wire and cable with coating/covering of polyvinyl chloride family resin composition in which generation of molecular contaminant can be avoided.

BACKGROUND ART

In recent years, along with high integration of semiconductor or liquid crystal device manufacturing apparatus, contamination of a substrate, in particular, of a silicon wafer due to, in addition to adhesion of dirt, absorption of molecular contaminant (Airborne Molecular Contaminants: AMCs) has become a matter. As a source of generating the AMCs, in addition to interior material of a clean room, electric wires or cables used in the clean room facility apparatus or in an apparatus for manufacturing various types of semiconductors, liquid crystal devices or so have been pointed out.

Plasticizer in an electric wire or a cable with coating/covering of polyvinyl chloride family resin composition used widely acts a main source of the AMCs. It is known to dramatically decrease generation of the AMCs by replacing the plasticizer with one having a large molecular weight and a low vapor pressure (for example, see PCT/JP98/1296).

However, in case of applying an electric wire with coating of non-lead polyvinyl chloride family resin composition (electric wire with coating of polyvinyl chloride family resin composition which does not contain lead compound as stabilizer) for which a demand has increased to be applied as an electric wire with coating of polyvinyl chloride family resin composition with a reduced environmental load, still much generation of AMCs occurs even after the above-mentioned measure is taken for the plasticizer, and, thus, it is still difficult to apply the same in a clean room or so.

DISCLOSURE OF THE INVENTION

An object of the present invention is to provide an electric wire and cable with coating/covering of polyvinyl chloride family resin composition suitable especially to be used within a clean room or so for the purpose of manufacturing semiconductors, liquid crystal devices or so by preventing a generation of the above-mentioned AMCs.

In order to attain the above-mentioned object, according to the present invention, an electric wire and cable with coating/covering of polyvinyl chloride family resin composition used in a clean room or so are provided characterized by having a coating/covering layer made of polyvinyl chloride family resin composition containing polyvinyl chloride family resin and one or a plurality of compounds selected from calcium soap, zinc soap, and hydrotalcite, but not containing any of lead compound and β-diketone having a melting point less than 100° C.

Furthermore, the polyvinyl chloride family resin composition used in the present invention may contain liquid plasticizer having a molecular weight of more than 500.

The inventors of the present invention and partners derived the above-mentioned present invention from the following standpoints. That is, as a result of analyzing wholeheartedly the AMCs generated from an electric wire with coating of non-lead polyvinyl chloride family resin composition, it found out that β-diketone compound chiefly used as stabilization auxiliaries together with a stabilizer including metal, such as calcium, zinc or so could act as a source of the AMCs. The β-diketone compound has a function of generally preventing coloring at a time of heat deterioration of polyvinyl chloride family resin, and it is expressed by a general formula of R.CO.CH2.CO.R' (where, R and R' denote hydrocarbon, a group including oxygen or chlorine in hydrocarbon, or fluoro carbon). Upon making a study for further detail, it turned out that the β-diketone compound having a melting point of less than 100° C. represented by dibenzoylmethane (melting point: 78° C.) or stearoyl benzoylmethane (melting point: 56° C.) caused outgassing in the main.

BRIEF EXPLANATION OF THE DRAWINGS

Below, embodiments of the present invention will be described with reference to the following drawings:

FIG. 3 shows compositions of respective polyvinyl chloride family resin compositions of embodiments 1 through 7 of the present invention and comparative examples 1 through 3 together with measurement results thereof.

BEST MODE FOR CARRYING OUT THE INVENTION

Figure 1:
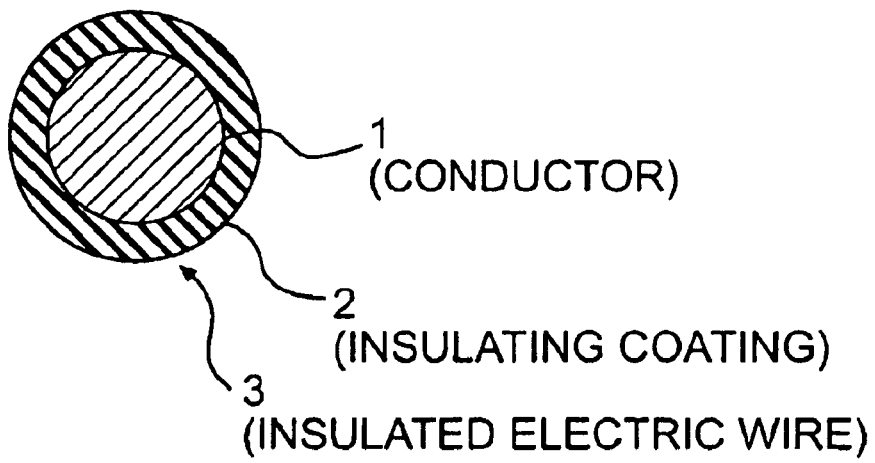
FIG. 1 shows a sectional view an embodiment in which the present invention is applied as an insulated electric wire.

According to the present invention, a use of liquid plasticizer of a low molecular weight, such as a di-(2-ethyl hexyl)phthalate, which acts as a main cause of the AMCs, should be avoided as plasticizer upon using polyvinyl chloride resin as base polymer, and it is preferable to blend, as plasticizer, polymer which has compatibility with polyvinyl chloride resin, such as acrylonitrilic butadiene rubber (NBR) or ethylene-vinyl acetate copolymer (EVA).

When using liquid plasticizer, it is necessary to apply plasticizer having a molecular weight larger than 500 in terms of the AMCs, and, as such plasticizer, the followings may be cited: tri-(2-ethyl hexyl)trimellitate (molecular weight of 547), tri-n-octyl trimellitate (molecular weight of 547), tri-isodecyl trimellitate (molecular weight of 630), tri-iso-octyl trimellitate (molecular weight of 546), di-tridecyl phthalate (molecular weight of 530), etc. However, it is not necessary to limit thereto, and, it is also possible to use a plurality of sorts of plasticizers together. Moreover, although no specific amount of adding is mentioned here since it depends on each particular type of relevant electric wire, roughly speaking, it is preferable to add by weight part approximately in a range between 30 and 150 with respect to polyvinyl chloride resin in 100 weight.

Furthermore, in the present invention, it is possible to use, as base polymer, EVA which is soft ethylene polymer, ethylene-ethyl acrylate copolymer (EEA), or material obtained from graft copolymerization of vinyl chloride with chlorinated polyethylene or so.

Moreover, it is necessary to combine, in an electric wire and cable according to the present invention, in order to prevent heat deterioration of polyvinyl chloride family resin, one or more of compounds selected from calcium soap, zinc soap, and the hydrotalcite. The calcium soap and zinc soap are calcium salt and zinc salt of higher fatty acid represented by stearic acid, lauric acid, ricinolic acid, or octylic acid. In addition to the above-mentioned stabilizer including metal, metal soap other than lead family can be added according to the spirit of the present invention. It is noted that chemistry composition of the above-mentioned hydrotalcite is basic magnesium aluminum hydroxy carbonate hydrate.

Amounts of adding the above-mentioned compounds acting as the stabilizers including metal may be preferably such that approximately in a range between 5 and 20 weight part with respect to polyvinyl chloride family resin of 100 weight, even through this amount depends on required heat resistance capability or so. If this amount is less than 5 weight part, the effect providing the heat resistance capability is reduced, while if it is more than 20 weight part, the lubricity becomes too much so that kneading workability of the compound tends to be degraded.

To polyvinyl chloride family resin composition according to the present invention, according to the rule, it is possible to add lubricant, filler, fire-resistant auxiliaries, colorant, oxidation inhibitor, anti-ant agent, anti-rodent agent, working auxiliaries, weather-proof agent, foaming agent or so. Furthermore, it is also possible that crosslinked polymer composition is produced employing organic peroxide. Furthermore, it is possible to cause crosslinkage by applying an electron beam to a covering composition layer.

Hereafter, the embodiments of the present invention and comparative examples will be described in a manner of comparison.

(Embodiment 1)

Polyvinyl chloride resin (average polymerization: 1300) in 100 weight part; NBR (containing 41 weight % of acrylonitrile; and Moony viscosity: 80) in 100 weight part; calcium stearate in 4 weight part; hydrotalcite in 6 weight part; calcined clay in 10 weight part; antimony trioxide in 6 weight part; and tetrakis-[methylene-3-(3',5'-di-third-butyl-4'-hydroxyphenylpropionate)methane in 0.3 weight part were put into an intermix, were then kneaded, and thus, a compound was produced.

With the compound, an insulating coating was formed on a tinned soft copper wire (conductor size: 24 AWG) by extrusion coating of the compound with a thickness of 0.45 mm by an extruder of 170° C., and, thus, an insulated electric wire was manufactured. Then, six of the thus-obtained insulated electric wires were twisted on a cotton yarn insertion wire, and then, after a paper holding tape was wound thereon, a protective covering was formed thereon with a thickness of 0.85 mm by extrusion coating of the above-mentioned compound with the extruder of 170° C. Thus, a cable was manufactured.

Figure 2:
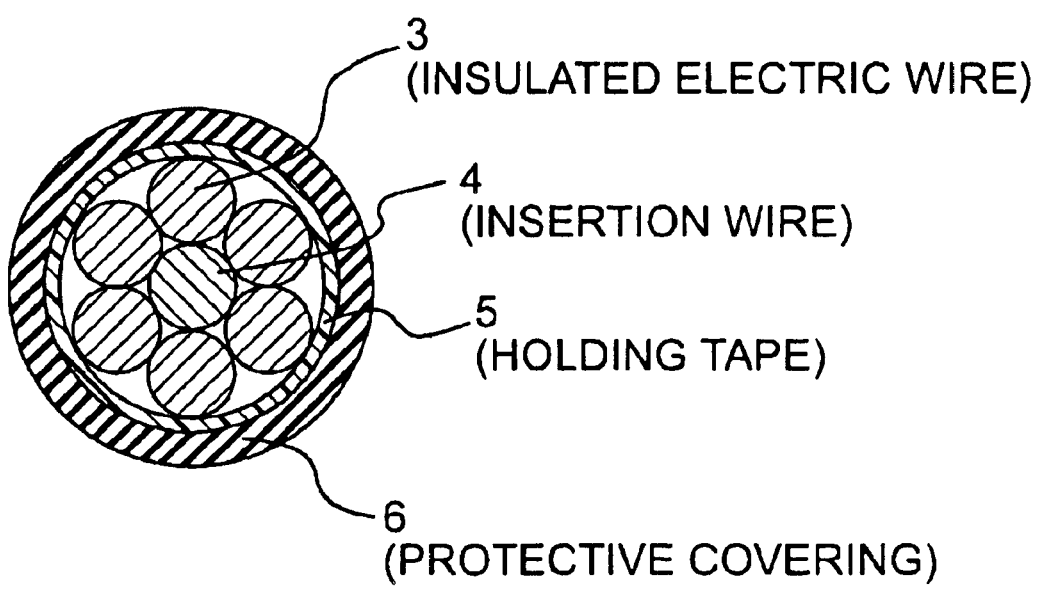
FIG. 2 shows a sectional view of an embodiment in which the present invention is applied as a cable.

FIG. 1 shows a sectional view of the insulated electric wire according to each embodiment of the present invention. There, the numeral 1 denotes the conductor; 2 denotes the insulating coating; and 3 denotes the insulated electric wire. FIG. 2 shows a sectional view of the cable according to each embodiment of the present invention. There, the numeral 3 denotes the insulated electric wire shown in FIG. 1; 4 denotes the insertion wire, 5 denotes the holding tape; and 6 denotes the protective covering.

(Embodiment 2)

Polyvinyl chloride resin (average polymerization: 1300) in 100 weight part; EVA (vinyl acetate content: 60 weight %; and melt flow rate: 50) in 100 weight part; calcium stearate in 2 weight part; zinc stearate in 2 weight part; hydrotalcite in 6 weight part; calcined clay in 10 weight part; antimony trioxide in 6 weight part; and tetrakis-[methylene-3-(3',5'-di-third-butyl-4'-hydroxyphenylpropionate)methane in 0.3 weight part were put into an intermix, were then kneaded, and thus, a compound was produced.

With the compound, an insulating coating was formed on a tinned soft copper wire (conductor size: 24 AWG) by extrusion coating of the compound with a thickness of 0.45 mm by an extruder of 170% C, and, thus, an insulated electric wire was manufactured. Then, six of the thus-obtained insulated electric wires were twisted on a cotton yarn insertion wire, and then, after a paper holding tape was wound thereon, a protective covering was formed thereon with a thickness of 0.85 mm by extrusion coating of the above-mentioned compound with the extruder of 170° C. Thus, a cable was manufactured.

(Embodiment 3)

Chlorinated polyethylene-vinyl chloride graft copolymer (chlorinity in the chlorinated polyethylene: 35 weight %; and vinyl chloride graft amount: 50 weight %) in 100 weight part; calcium stearate in 5 weight part; zinc stearate in 5 weight part; calcined clay in 10 weight part; antimony trioxide in 6 weight part; and tetrakis-[methylene-3-(3',5'-di-third-butyl-4'-hydroxyphenylpropionate)methane in 0.3 weight part were put into an intermix, were then kneaded, and thus, a compound was produced.

With the compound, an insulating coating was formed on a tinned soft copper wire (conductor size: 24 AWG) by extrusion coating of the compound with a thickness of 0.45 mm by an extruder of 170° C., and, thus, an insulated electric wire was manufactured. Then, sixth of the thus-obtained insulated electric wires were twisted on a cotton yarn insertion wire, and then, after a paper holding tape was wound thereon, a protective covering was formed thereon with a thickness of 0.85 mm by extrusion coating of the above-mentioned compound with the extruder of 170° C. Thus, a cable was manufactured.

(Embodiment 4)

Polyvinyl chloride resin (average polymerization: 1300) in 100 weight part; ditridecyl phthalate (molecular weight: 530) in 80 weight part; calcium stearate in 2 weight part; zinc stearate in 2 weight part; hydrotalcite in 6 weight part; calcined clay in 10 weight part; antimony trioxide in 6 weight part; and tetrakis-[methylene-3-(3',5'-di-third-butyl-4'-hydroxyphenylpropionate)methane in 0.3 weight part were put into an intermix, were then kneaded, and thus, a compound was produced.

With the compound, an insulating coating was formed on a tinned soft copper wire (conductor size: 24 AWG) by extrusion coating of the compound with a thickness of 0.45 mm by an extruder of 170° C., and, thus, an insulated electric wire was manufactured. Then, six of the thus-obtained insulated electric wires were twisted on a cotton yarn insertion wire, and then, after a paper holding tape was wound thereon, a protective covering was formed thereon with a thickness of 0.85 mm by extrusion coating of the above-mentioned compound with the extruder of 170° C. Thus, a cable was manufactured.

(Embodiment 5)

Polyvinyl chloride resin (average polymerization: 1300) in 100 weight part; tri-(2-ethyl hexyl)trimellitate (molecular weight: 547) in 80 weight part; zinc stearate in 4 weight part; hydrotalcite in 6 weight part; calcined clay in 10 weight part; antimony trioxide in 6 weight part; and tetrakis-[methylene 3-(3', 5'-di-third-butyl-4'-hydroxyphenylpropionate) methane in 0.3 weight part were put into an intermix, were then kneaded, and thus, a compound was produced.

With the compound, an insulating coating was formed on a tinned soft copper wire (conductor size: 24 AWG) by extrusion coating of the compound with a thickness of 0.45 mm by an extruder of 170° C., and, thus, an insulated electric wire was manufactured. Then, six of the thus-obtained insulated electric wires were twisted on a cotton yarn insertion wire, and then, after a paper holding tape was wound thereon, a protective covering was formed thereon with a thickness of 0.85 mm by extrusion coating of the above-mentioned compound with the extruder of 170° C. Thus, a cable was manufactured.

(Embodiment 6)

Polyvinyl chloride resin (average polymerization: 1300) in 100 weight part; tri-(2-ethyl hexyl)trimellitate (molecular weight: 547) in 80 weight part; calcium stearate in 2 weight part; zinc stearate in 2 weight part; hydrotalcite in 6 weight part; bis(4-ethyl benzoyl)methane (melting point: 125° C.) in 1 weight part; calcined clay in 10 weight part; antimony trioxide in 6 weight part; and tetrakis-[methylene-3-(3',5'-di-third-butyl-4'-hydroxyphenylpropionate)methane in 0.3 weight part were put into an intermix, were then kneaded, and thus, a compound was produced.

With the compound, an insulating coating was formed on a tinned soft copper wire (conductor size: 24 AWG) by extrusion coating of the compound with a thickness of 0.45 mm by an extruder of 170° C., and, thus, an insulated electric wire was manufactured. Then, six of the thus-obtained insulated electric wires were twisted on a cotton yarn insertion wire, and then, after a paper holding tape was wound thereon, a protective covering was formed thereon with a thickness of 0.85 mm by extrusion coating of the above-mentioned compound with the extruder of 170° C. Thus, a cable was manufactured.

(Embodiment 7)

Polyvinyl chloride resin (average polymerization: 1300) in 100 weight part; tri-(2-ethyl hexyl)trimellitate (molecular weight: 547) in 80 weight part; calcium stearate in 2 weight part; zinc stearate in 2 weight part; hydrotalcite in 6 weight part; bis(4-methoxy benzoyl)methane (melting point: 140° C.) in 1 weight part; calcined clay in 10 weight part; antimony trioxide in 6 weight part; and tetrakis-[methylene-3-(3',5'-di-third-butyl-4'-hydroxyphenylpropionate)methane in 0.3 weight part were put into an intermix, were then kneaded, and thus, a compound was produced.

With the compound, an insulating coating was formed on a tinned soft copper wire (conductor size: 24 AWG) by extrusion coating of the compound with a thickness of 0.45 mm by an extruder of 170° C., and, thus, an insulated electric wire was manufactured. Then, six of the thus-obtained insulated electric wires were twisted on a cotton yarn insertion wire, and then, after a paper holding tape was wound thereon, a protective covering was formed thereon with a thickness of 0.85 mm by extrusion coating of the above-mentioned compound with the extruder of 170° C. Thus, a cable was manufactured.

COMPARATIVE EXAMPLE 1

Polyvinyl chloride resin (average polymerization: 1300) in 100 weight part; di(2-ethyl hexyl)phthalate (molecular weight: 391) in 80 weight part; calcium stearate in 2 weight part; zinc stearate in 2 weight part; hydrotalcite in 6 weight part; dibenzoylmethane (melting point: 78° C.) in 1 weight part; calcined clay in 10 weight part; antimony trioxide in 6 weight part; and tetrakis-[methylene-3-(3',5'-di-third-butyl-4'-hydroxyphenylpropionate)methane in 0.3 weight part were put into an intermix, were then kneaded, and thus, a compound was produced.

With the compound, an insulating coating was formed on a tinned soft copper wire (conductor size: 24 AWG) by extrusion coating of the compound with a thickness of 0.45 mm by an extruder of 170° C., and, thus, an insulated electric wire was manufactured. Then, six of the thus-obtained insulated electric wires were twisted on a cotton yarn insertion wire, and then, after a paper holding tape was wound thereon, a protective covering was formed thereon with a thickness of 0.85 mm by extrusion coating of the above-mentioned compound with the extruder of 170° C. Thus, a cable was manufactured.

COMPARATIVE EXAMPLE 2

Polyvinyl chloride resin (average polymerization: 1300) in 100 weight part; tri-(2-ethyl hexyl)trimellitate (molecular weight: 547) in 80 weight part; calcium stearate in 2 weight part; zinc stearate in 2 weight part; hydrotalcite in 6 weight part; dibenzoylmethane (melting point: 78° C.) in 1 weight part; calcined clay in 10 weight part; antimony trioxide in 6 weight part; and tetrakis-[methylene-3-(3',5'-di-third-butyl-4'-hydroxyphenylpropionate)methane in 0.3 weight part were put into an intermix, were then kneaded, and thus, a compound was produced.

With the compound, an insulating coating was formed on a tinned soft copper wire (conductor size: 24 AWG) by extrusion coating of the compound with a thickness of 0.45 mm by an extruder of 170° C., and, thus, an insulated electric wire was manufactured. Then, six of the thus-obtained insulated electric wires were twisted on a cotton yarn insertion wire, and then, after a paper holding tape was wound thereon, a protective covering was formed thereon with a thickness of 0.85 mm by extrusion coating of the above-mentioned compound with the extruder of 170° C. Thus, a cable was manufactured.

COMPARATIVE EXAMPLE 3

Polyvinyl chloride resin (average polymerization: 1300) in 100 weight part; EVA (vinyl acetate content: 60 weight %; and melt flow rate: 50) in 100 weight part; calcium stearate in 2 weight part; zinc stearate in 2 weight part; hydrotalcite in 6 weight part; stearoyl benzoylmethane (melting point: 56° C.); calcined clay in 10 weight part; antimony trioxide in 6 weight part; and tetrakis-[methylene-3-(3',5'-di-third-butyl-4'-hydroxyphenylpropionate)methane in 0.3 weight part were put into an intermix, were then kneaded, and thus, a compound was produced.

With the compound, an insulating coating was formed on a tinned soft copper wire (conductor size: 24 AWG) by extrusion coating of the compound with a thickness of 0.45 mm by an extruder of 170° C., and, thus, an insulated electric wire was manufactured. Then, six of the thus-obtained insulated electric wires were twisted on a cotton yarn insertion wire, and then, after a paper holding tape was wound thereon, a protective covering was formed thereon with a thickness of 0.85 mm by extrusion coating of the above-mentioned compound with the extruder of 170° C. Thus, a cable was manufactured.

Then, 2 g of protective covering was stripped off from each of the cables according to the above-mentioned embodiments 1 through 7 and comparative examples 1 through 3, and was thus used as a sample for AMCs measurement.

The measurement for AMCs was based the appendix 2 'Dynamic Head Space-Screening Test Method' of JACA No. 34-1999 'Measurement Method Guideline for Molecular Contaminant Generated from Clean Room Construction Material', and according to the appendix 7 'Gas Chromatograph Method' of the same. The sample was heated for one hour at a heating temperature of 120° C., and, in gas chromatography, a capillary column with an inner diameter of 0.25 mm, dimethyl polysiloxane coating (coating thickness: 0.25 μm) and a length of 60 m was used. A heating program for the column was such that heating was performed at 10° C./min. between 40° C. and 280° C., and after that, the state was maintained for 40 minutes. By this operation, it was assumed that all the substance detected by a mass analyzer was n-decane which was reference material, the n-decane-equivalent quantity of generated gas was obtained from a detection analytical curve of the n-decane, and the thus-obtained value was regarded as the AMCs. For a criterion on the AMCs, the material which had the generated gas quantity less than 2000 μg per 1 g of the polyvinyl chloride family resin coating/covering material was determined as acceptable.

FIG. 3 shows the compositions of the respective polyvinyl chloride family resin compositions of the embodiments 1 through 7 and the comparative examples 1 through 3 with the measurement results thus obtained. As can be seen therefrom, the generated gas quantity of any of the embodiments 1 through 7 of the present invention lies within the acceptable range. On the other hand, the comparative example 1 which employs the plasticizer having the low molecular weight, and the comparative examples 2 and 3, which employ the β-diketone compounds with the high molecular weight but the melting point less than 100° C. have much amounts in outgassing, and thus, are not acceptable.

As described above, an electric wire and cable according to the present invention with covering/coating of polyvinyl chloride family resin composition including one or a plurality of compounds selected from calcium soap, zinc soap and hydrotalcite, and not including lead compound and β-diketone having a melting point less than 100° C., has a smaller amount in molecular contaminant (AMCs) than that in an electric wire and cable with covering/coating of conventional polyvinyl chloride family resin composition, is preferable to be used within a clean room used for manufacturing semiconductors or for high-precision processing industry, and, thus, has a very high industrial value.

The present invention is not limited to the above-described respective embodiments, and may be applied as various embodiments and variants without departing from the technical scope claimed in the claims.

The present application is based on Japanese priority application No. 2001-160047, filed on May 29, 2001, the entire contents of which are hereby incorporated by reference.

What is claimed is:

1. An electric wire with coating of polyvinyl chloride family resin composition characterized by having a coating layer comprising polyvinyl chloride family composition obtained from adding more than one of any of calcium soap, zinc soap and hydrotalcite to resin comprising polyvinyl chloride resin as a main constituent, and further adding thereto plasticizer so as to obtain a heat-stable vinyl chloride composition, and further adding thereto as stabilization auxiliaries high-melting-point β-diketone compound having a melting point more than 100° C. out of β-diketone compounds expressed by a general formula of:

R.CO.CH2.CO.R'.

2. The electric wire with coating of polyvinyl chloride family resin composition claimed in claim 1, wherein:
said polyvinyl chloride family resin composition contains one or a plurality of compounds selected from calcium soap, zinc soap and hydrotalcite in a range between 5 and 20 weight part with respect to polyvinyl chloride family resin in 100 weight part.

3. The electric wire with coating of polyvinyl chloride family resin composition claimed in claim 1, wherein:
said polyvinyl chloride family resin comprises polyvinyl chloride resin.

4. The electric wire with coating of polyvinyl chloride family resin composition claimed in claim 3, wherein:
said polyvinyl chloride family resin composition contains, as plasticizer, polymer having compatibility with polyvinyl chloride resin.

5. The electric wire with coating of polyvinyl chloride family resin composition claimed in claim 3, wherein:
said polyvinyl chloride family resin composition contains, as plasticizer, liquid plasticizer with a molecular weight more than 500.

6. The electric wire with coating of polyvinyl chloride family resin composition claimed in claim 1, wherein:
said polyvinyl chloride family resin comprises polymer obtained from graft copolymerization of soft ethylene polymer with vinyl chloride.

7. A cable with covering of polyvinyl chloride family resin composition characterized by having a covering layer comprising polyvinyl chloride family composition obtained from adding more than one of any of calcium soap, zinc soap and hydrotalcite to resin comprising polyvinyl chloride resin as a main constituent and further adding thereto plasticizer so as to obtain a heat-stable vinyl chloride composition, and further adding thereto as stabilization auxiliaries high-melting-point β-diketone compound having a melting point of more than 100° C. out of β-diketone compounds expressed by a general formula of:

R.CO.CH2.CO.R'.

8. The cable with covering of polyvinyl chloride family resin composition claimed in claim 7, wherein:
said polyvinyl chloride family resin composition contains one or a plurality of types of compounds selected from calcium soap, zinc soap and hydrotalcite in a range between 5 and 20 weight part with respect to polyvinyl chloride family resin in 100 weight part.

9. The cable with covering of polyvinyl chloride family resin composition claimed in claim 7, wherein:
said polyvinyl chloride family resin comprises polyvinyl chloride resin.

10. The cable with covering of polyvinyl chloride family resin composition claimed in claim 9, wherein:
said polyvinyl chloride family resin composition contains, as plasticizer, polymer having compatibility with polyvinyl chloride resin.

11. The cable with covering of polyvinyl chloride family resin composition claimed in claim 9, wherein:
said polyvinyl chloride family resin composition contains, as plasticizer, liquid plasticizer with a molecular weight more than 500.

12. The cable wire with covering of polyvinyl chloride family resin composition claimed in claim 7, wherein:
said polyvinyl chloride family resin comprises polymer obtained from graft copolymerization of soft ethylene polymer with vinyl chloride.

13. A cable with covering of polyvinyl chloride family resin composition characterized by having electric wires with coating layers comprising polyvinyl chloride family composition obtained from adding more than one of any of calcium soap, zinc soap and hydrotalcite to resin comprising polyvinyl chloride resin as a main constituent and further adding thereto plasticizer so as to obtain a heat-stable vinyl chloride composition, and further adding thereto as stabilization auxiliaries high-melting-point β-diketone compound having a melting point more than 100° C. out of β-diketone compounds expressed by a general formula of:

R.CO.CH2.CO.R', and further having a covering layer of said polyvinyl chloride family composition.

14. The cable with covering of polyvinyl chloride family resin composition claimed in claim 13, wherein:
   said polyvinyl chloride family resin composition contains one or a plurality of types of compounds selected from calcium soap, zinc soap and hydrotalcite in a range between 5 and 20 weight part with respect to polyvinyl chloride family resin in 100 weight part.

15. The cable with covering of polyvinyl chloride family resin composition claimed in claim 13, wherein:
   said polyvinyl chloride family resin comprises polyvinyl chloride resin.

16. The cable with covering of polyvinyl chloride family resin composition claimed in claim 15, wherein:
   said polyvinyl chloride family resin composition contains, as plasticizer, polymer having compatibility with polyvinyl chloride resin.

17. The cable with covering of polyvinyl chloride family resin composition claimed in claim 15, wherein:
   said polyvinyl chloride family resin composition contains, as plasticizer, liquid plasticizer with a molecular weight more than 500.

18. The cable with covering of polyvinyl chloride family resin composition claimed in claim 13, wherein:
   said polyvinyl chloride family resin comprises polymer obtained from graft copolymerization of soft ethylene polymer with vinyl chloride.

19. An electric wire with coating of polyvinyl chloride family resin composition characterized by having a coating layer comprising polyvinyl chloride family composition obtained from adding more than one of any of calcium soap, zinc soap and hydrotalcite to resin comprising polyvinyl chloride resin as a main constituent, and further adding thereto plasticizer with a molecular weight more than 500 so as to obtain a heat-stable vinyl chloride composition.

20. A cable with covering of polyvinyl chloride family resin composition characterized by having a covering layer comprising polyvinyl chloride family composition obtained from adding more than one of any of calcium soap, zinc soap and hydrotalcite to resin comprising polyvinyl chloride resin as a main constituent and further adding thereto plasticizer with a molecular weight of more than 500 so as to obtain a heat-stable vinyl chloride composition.

21. A cable with covering of polyvinyl chloride family resin composition characterized by having electric wires with coating layers comprising polyvinyl chloride family composition obtained from adding more than one of any of calcium soap, zinc soap and hydrotalcite to resin comprising polyvinyl chloride resin as a main constituent and further adding thereto plasticizer with a molecular weight of more than 500 so as to obtain a heat-stable vinyl chloride composition, and further having a covering layer of said polyvinyl chloride family composition.

* * * * *